United States Patent
Cheng et al.

(10) Patent No.: US 9,602,769 B2
(45) Date of Patent: Mar. 21, 2017

(54) TIMESTAMP-BASED AUDIO AND VIDEO PROCESSING METHOD AND SYSTEM THEREOF

(71) Applicants: Hsin-Chieh Cheng, Taipei (TW);
Kun-Hsuan Chang, Taipei (TW);
Ming-Che Weng, Taipei (TW)

(72) Inventors: Hsin-Chieh Cheng, Taipei (TW);
Kun-Hsuan Chang, Taipei (TW);
Ming-Che Weng, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 14/993,091

(22) Filed: Jan. 12, 2016

(65) Prior Publication Data
US 2016/0205349 A1   Jul. 14, 2016

Related U.S. Application Data

(60) Provisional application No. 62/102,533, filed on Jan. 12, 2015.

(51) Int. Cl.
*H04N 7/15* (2006.01)
*H04N 5/06* (2006.01)
(Continued)

(52) U.S. Cl.
CPC ............... *H04N 7/15* (2013.01); *H04N 5/06* (2013.01); *H04N 7/142* (2013.01); *H04N 7/147* (2013.01);
(Continued)

(58) Field of Classification Search
CPC H04N 7/15; H04N 7/152; H04N 7/14; H04N 7/141; H04L 7/0008; H04L 47/2475; H04L 41/509
(Continued)

(56) References Cited

U.S. PATENT DOCUMENTS

| | | |
|---|---|---|
| 7,768,558 B1 | 8/2010 | Schinner et al. |
| 2004/0022262 A1* | 2/2004 | Vinnakota ............... H04L 49/90 370/429 |

(Continued)

FOREIGN PATENT DOCUMENTS

| | | |
|---|---|---|
| TW | 589892 | 6/2004 |
| TW | I420513 | 12/2013 |

OTHER PUBLICATIONS

"Office Action of Taiwan Counterpart Application", issued on Dec. 19, 2016, p. 1-p. 11, in which the listed reference was cited.

*Primary Examiner* — Melur Ramakrishnaiah
(74) *Attorney, Agent, or Firm* — Jianq Chyun IP Office

(57) ABSTRACT

A timestamp-based audio and video processing method and a system thereof are provided. The method is adapted to an electronic device having an image capturing device and an audio input device and includes the following steps. First, an image signal and an audio signal are extracted within a same time interval by respectively using the image capturing device and the audio input device so as to generate video data and audio data, and the time interval is converted to timestamp data, where the video data includes a single video frame with a variable file size, the audio data includes multiple audio files with a fixed file size. Next, the video data, the audio data, and the timestamp data are integrated into transmission data.

13 Claims, 9 Drawing Sheets

(51) Int. Cl.
*H04N 21/234* (2011.01)
*H04N 21/236* (2011.01)
*H04N 21/242* (2011.01)
*H04N 21/43* (2011.01)
*H04N 21/434* (2011.01)
*H04N 21/44* (2011.01)
*H04N 21/8547* (2011.01)
*H04N 7/14* (2006.01)

(52) U.S. Cl.
CPC ....... *H04N 7/152* (2013.01); *H04N 21/23424* (2013.01); *H04N 21/23614* (2013.01); *H04N 21/242* (2013.01); *H04N 21/4302* (2013.01); *H04N 21/4348* (2013.01); *H04N 21/44016* (2013.01); *H04N 21/8547* (2013.01)

(58) Field of Classification Search
USPC .......................................... 348/14.01–14.16
See application file for complete search history.

(56) References Cited

U.S. PATENT DOCUMENTS

2006/0244818 A1\* 11/2006 Majors ................ H04L 12/1822
348/14.08
2008/0034104 A1\* 2/2008 Kariti ..................... G06Q 10/10
709/231

\* cited by examiner

TIMESTAMP-BASED AUDIO AND VIDEO PROCESSING METHOD AND SYSTEM THEREOF

TECHNICAL FIELD

The invention relates to an audio and video processing method and a system thereof, in particular to, a timestamp-based audio and video processing method and a system thereof.

BACKGROUND

As electronic technology and communication network have been continuously developed, hardware, software, and features of video conferencing are notably enhanced. The current video conferencing allows multiple users to be connected with each other at anytime through electronic devices such as computers, smart phones, and tabular computers. While the users are voice calling each other, they would be able to see others' motion through screens, and a realistic telepresence experience in communication would be thereby enhanced. Accordingly, video conferencing has been extensively used in business communication so that enterprises are able to perform cross-regional communication internally and externally.

In general, to minimize data amount for video and audio data transmission, video and audio data would be separated, encoded and compressed before transmitted to a remote device. Since the sizes of a video packet and an audio packet are different, their transmission times would also be different. Accordingly, after a receiving device receives the packets, the video data and the audio data could not be synchronizedly played, and thus the quality and efficiency of the communication would be affected.

SUMMARY OF THE INVENTION

Accordingly, the invention is directed to an audio and video processing method and a system thereof, where particular data formats of audio data, video data, and timestamp data are set as transmission data so that a data receiving device is allowed to accomplish audio-to-video synchronization.

A timestamp-based audio and video processing method adapted to an electronic device is provided. The method includes the following steps: extracting an image signal and an audio signal within a same time interval by using the image capturing device and the audio receiving device respectively so as to generate video data and audio data, and converting the time interval to timestamp data, where the video data comprises a single video frame with a variable file size, and where the audio data includes multiple audio files with a fixed file size; and integrating the video data, the audio data, and the timestamp data into transmission data.

According to an embodiment, the step of extracting the image signal by using the image capturing device so as to generate the video data includes: extracting the image signal by using the image capturing device; and digitizing and compressing the image signal to the video data with the variable file size.

According to an embodiment, the step of converting the time interval to the timestamp data includes: generating the timestamp data according to the time interval and a packet sequence number.

According to an embodiment, the step of integrating the video data, the audio data, and the timestamp data into the transmission data includes: generating an audio-video packet as the transmission data by using the video data, the audio data, and the timestamp data.

According to an embodiment, the step of integrating the video data, the audio data, and the timestamp data into the transmission data includes: generating a video packet by using the video data; generating an audio packet by using the audio data and the timestamp data; and setting the video packet and the audio packet as the transmission data.

According to an embodiment, after the step of integrating the video data, the audio data, and the timestamp data into the transmission data, the method further includes: transmitting the transmission data to another electronic device.

A timestamp-based audio and video processing method adapted to an electronic device is provided. The method includes the following steps: obtaining first transmission data from a first source, where the first transmission data includes first video data, first audio data, and first timestamp data, where the first video data includes a single video frame with a variable file size, and where the first audio data includes multiple audio files with a fixed file size; and playing the first video data and the first audio data respectively by using the screen and the audio playing device according to the first timestamp data of the first transmission data.

According to an embodiment, the first transmission data is an audio-video packet including the first video data, the first audio data, and the first timestamp data, and the electronic device includes a first data buffer having multiple first temporary positions. After the step of obtaining the first transmission data from the first source, the method further includes: pushing the first audio-video packet to the first temporary positions sequentially according to the first timestamp data in the first audio-video packet.

According to an embodiment, the step of playing the first video data and the first audio data respectively by using the screen and the audio playing device according to the first timestamp data of the first transmission data includes: when the first audio-video packet is sorted at first among the first temporary positions, playing the first video data and the first audio data in the first audio-video packet.

According to an embodiment, the electronic device further includes a second data buffer having multiple second temporary positions, and the method further includes: obtaining second transmission data from a second source, where the second transmission data is a second audio-video packet including second video data, second audio data, and second timestamp data, where the second video data includes a single video frame with a variable file size, and where the second audio data includes multiple audio files with a fixed file size; pushing the second audio-video packet to the second temporary positions sequentially according to the second timestamp data in the second audio-video packet; and when the first audio-video packet is sorted at first among the first temporary positions and when the second audio-video packet is sorted at first among the second temporary positions, concurrently playing the first video data and the first audio data in the first audio-video packet as well as the second video data and the second audio data in the second audio-video packet.

According to an embodiment, the electronic device concurrently plays the first video data and the second video data by a multi-window or a pop-up play on the screen.

According to an embodiment, the first transmission data is a first video packet including the first video data and a first audio packet including the first audio data and the first timestamp data, and the electronic device includes a first video buffer having a single first video temporary position and a first audio buffer having multiple first audio temporary positions, and after the step of obtaining the first transmission data from the first source, the method further includes: pushing the first video packet to the first video temporary position; and pushing the first audio packet to the first audio temporary positions sequentially according to the first timestamp data in the first audio packet.

According to an embodiment, the step of pushing the first video packet to the first video temporary position includes: when there exists another packet at the first video temporary position, overwriting the another packet by the first video packet.

According to an embodiment, the step of playing the first video data and the first audio data respectively by using the screen and the audio playing device according to the first timestamp data of the first transmission data includes: immediately playing the first video data in the first video packet at the first video temporary position by using the screen; and when the first audio packet is sorted first among the first audio temporary positions, playing the first audio data in the first audio packet by using the audio playing device.

According to an embodiment, the electronic device further includes a second video buffer having a single second video temporary position and a second audio buffer having multiple second audio temporary positions, and the method further includes: obtaining second transmission data from a second source, where the second transmission data is a second video packet including second video data and a second audio packet including second audio data and second timestamp data, where the second video data includes a single video frame with a variable file size, and where the second audio data includes multiple audio files with a fixed file size; pushing the second video packet to the second video temporary position; pushing the second audio packet to the second audio temporary positions sequentially according to the second timestamp data in the second audio packet; selecting one of the first video data in the first video packet and the second video data in the second video packet to be selected video data; when the first audio packet and the second audio packet are respectively sorted at first among the first audio temporary positions and the second audio temporary positions, integrating the first audio data in the first audio packet and the second audio data in the second audio packet into integrated audio data; and playing the selected video data and the integrated audio data by respectively using the screen and the audio playing device.

According to an embodiment, the step of selecting one of the first video data in the first video packet and the second video data in the second video packet to be the selected video data includes: calculating an average volume of the first audio data and an average volume of the second audio data respectively to obtain a first average volume and a second average volume; when the first average volume is greater than the second average volume, selecting the first video data to be the selected video data; and when the second average volume is greater than the first average volume, selecting the second video data to be the selected video data.

A timestamp-based audio and video processing system including at least one client device and a host device is provided. Each of the at least one client device respectively generates client transmission data including client audio data, client video data, and client timestamp data, where the client video data includes a single video frame with a variable file size, and where the client audio data includes multiple audio files with a fixed file size. The host device is connected to each of the at least one client device, where the host device receives the client transmission data from each of the at least one client device and plays the corresponding client video data and the corresponding audio data according to the client timestamp data in the client transmission data.

According to an embodiment, the host device further generates host transmission data having host audio data, host video data, and host timestamp data, where the host video data includes a single video frame with a variable file size, where the host audio data includes multiple audio files with a fixed file size. The host device further plays the host video data and the host audio data according to the host timestamp data in the host transmission data.

According to an embodiment, each of the at least one piece of client transmission data is an audio-video packet generated from the client video data, the client audio data, and the client timestamp data, where the host transmission data is an audio-video packet generated from the host video data, the host audio data, and the host timestamp data.

According to an embodiment, each of the at least one piece of client transmission data is a video packet generated from the client video data and an audio packet generated from the client audio data and the timestamp data, and the host transmission data is a video packet generated from the host video data and an audio packet generated from the host audio data and the host timestamp data.

In summary, in the timestamp-based audio and video processing method and the system thereof, an audio signal and an image signal would be extracted and converted to transmission data with particular data formats of audio data, video data, and timestamp data so that a data receiving device is allowed to accomplish audio-to-video synchronization.

In order to make the aforementioned features and advantages of the present invention comprehensible, preferred embodiments accompanied with figures are described in detail below. It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
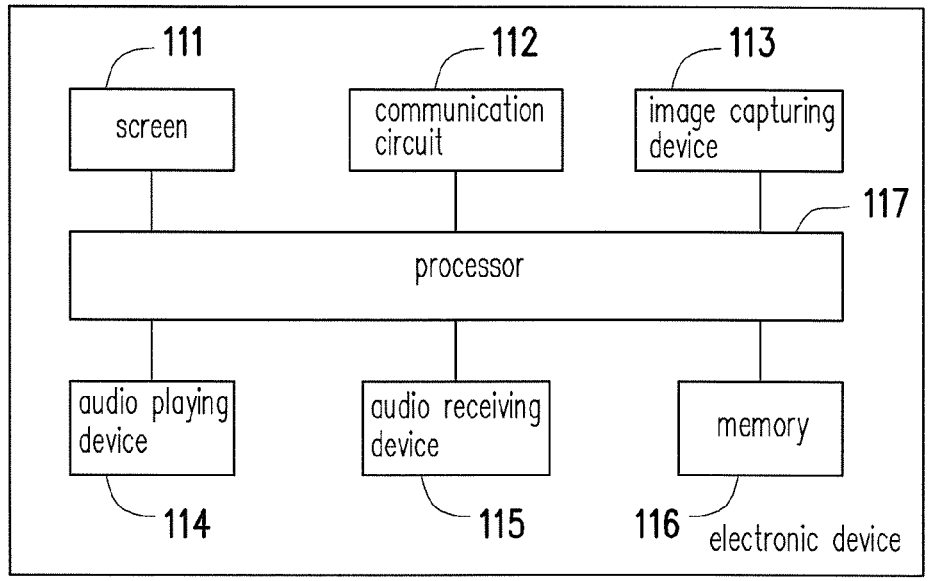
FIG. 1 illustrates a schematic diagram of an electronic device able to execute an audio and video processing method according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts. Indeed, various embodiments of the invention may be embodied in many different forms and should not be construed as limited to the embodiments set forth herein; rather, these embodiments are provided so that this invention will satisfy applicable legal requirements.

FIG. 1 illustrates a schematic diagram of an electronic device able to execute an audio and video processing method according to an embodiment of the invention. It should, however, be noted that this is merely an illustrative example and the invention is not limited in this regard. All components of the electronic device and their configurations are first introduced in FIG. 1. The detailed functionalities of the components are disclosed along with FIG. 2.

Referring to FIG. 1, an electronic device 100 includes a screen 111, a communication circuit 112, an image capturing device 113, an audio playing device 114, an audio receiving device 115, a memory 116, and a processor 117. In the present embodiment, the electronic device 100 could be an electronic device such as a personal computer, a laptop computer, a smart phone, a tabular computer, or a personal digital assistant, and so forth. The invention is not limited in this regard.

The screen 111 is configured to display images outputted by the electronic device 100 for the user. In the present embodiment, the screen 111 could be a liquid crystal display (LCD), a light-emitting diode (LED) display, a field emission display (FED), or other types of displays.

The communication circuit 112 is configured to connect to other devices through a communication network and could be a component capable of supporting wireless internet access such as WiMAX, Wi-Fi, 3G, or 4G, wired internet access such as ADSL or optical fibre network. The invention is not limited in this regard.

The image capturing device 113 is configured to capture images in front thereof and could be a camera with charge-coupled device (CCD) elements, complementary metal-oxide semiconductor (CMOS) elements, or other types of lens. The image capturing device 113 could be a web camera, a digital camera, a single lens reflex camera, or a digital camcorder built-in in the electronic device 100 or externally connected to the electronic device 100.

The audio playing device 114 is configured to play audio and includes a speaker. The audio receiving device 115 is configured to receive audio and includes a microphone. The audio playing device 114 and the audio receiving device 115 could be externally connected to or built-in in the electronic device 100. Moreover, when the audio playing device 114 and the audio receiving device 115 are externally connected to the electronic device 100, they could be integrated as a single device such as a headset.

The memory 116 is configured to store file data and could be one or a combination of a stationary or mobile random access memory (RAM), a read-only memory (ROM), a flash memory, a hard drive or other similar devices.

The processor 117 is coupled to the screen 111, the communication circuit 112, the image capturing device 113, the audio playing device 114, the audio receiving device 115, and the memory 116, and is configured to control and integrate the operations among the aforementioned components. The processor 117 could be, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices.

Figure 2:
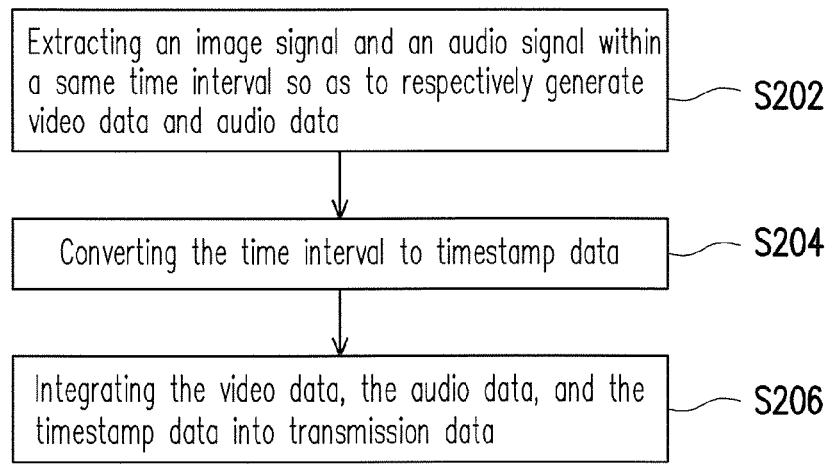
FIG. 2 illustrates a flowchart of a timestamp-based audio and video processing method according to an embodiment of the invention.

FIG. 2 illustrates a flowchart of a timestamp-based audio and video processing method according to an embodiment of the invention. The method in the present embodiment is adapted to the electronic device 100 as illustrated in FIG. 1. Detailed steps of the timestamp-based audio and video processing method would be described along with each component of the electronic device 100.

Referring to FIG. 2, the processor 117 of the electronic device 100 would first extract an image signal and an audio signal within a same time interval using the image capturing device 113 and the audio receiving device 115 respectively so as to generate video data and audio data (Step S202). Herein, the processor 117 of the electronic device 100 may extract the image signal and the audio signal once every 17-50 ms by using the image capturing device 113 and the audio receiving device 115. It should be noted that, in other embodiments, the processor 116 may also obtain the image signal and the audio signal from a multimedia stream obtained from other sources or a multimedia file stored in the memory 116. The invention is not limited in this regard. The processor 117 of the electronic device 100 would generate video data and audio data from the extracted image signal and the extracted audio signal received within every time interval.

To be specific, the processor 117 of the electronic device 100 would digitize and compress the extracted image signal to the video data. The video data includes a signal video frame with a variable file size; that is, the processor 117 of the electronic device 100 may compress a single video frame to any file size. For example, the processor 117 of the electronic device 100 could determine the file size according to different network transmission bandwidths. In an example, the compressed single video frame could be in a bitmap format and with a file size of 9,830,400 bits, where the width and the height of the image resolution could be 640 pixels and 480 pixels respectively, the number of the color channels could be four (e.g. RGB color channels as well as an a component to control the transparency), and the depth of each channel could be 3 bits.

The audio data includes multiple audio files with a fixed file size. In an example, assume that the video data is played in 30 fps. When the audio sample frequency is 44,100 Hz, a single video frame would correspond to 1470 audio samples. For 8-bit audio resolution, a single video frame would correspond to an audio file size of 11,760 bits. In another example, assume that the video data is played in 15 fps. When the audio sample frequency is 22,050 Hz, a single video frame would correspond to 1470 audio samples. For 4-bit audio resolution, a single video frame would correspond to an audio file size of 88,200 bits.

Next, after the processor 117 of the electronic device 100 generates the video data and the audio data, it would convert the time interval to timestamp data (Step S204). To be specific, the processor 117 of the electronic device 100 could generate the timestamp data according to the time interval and a packet sequence number. Herein, the time interval includes information such as date and time, and the packet sequence number is a sequence number assigned to a packet to be generated in chronological order.

Next, the processor 117 of the electronic device 100 would integrate the audio data, the video data, and the timestamp data into transmission data (Step S206). Herein, the transmission data could be classified into two data formats such as a single audio-video packet as illustrated in FIG. 3A according to an embodiment of the invention, or a separated video packet and a separated audio packet as illustrated in FIG. 3B according to an embodiment of the invention.

Figure 3A:
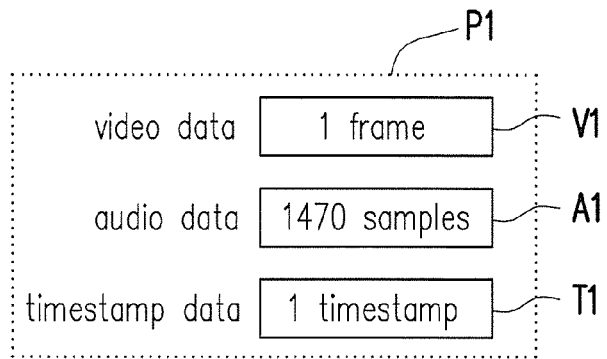
FIG. 3A illustrates a schematic diagram of a single audio-video packet according to an embodiment of the invention.

Referring to FIG. 3A, in the present embodiment, the processor 117 of the electronic device 100 would generate a single audio-video packet P1 by using audio data A1, video data V1, and timestamp data T1, and set the audio-video packet P1 as the transmission data.

Figure 3B:
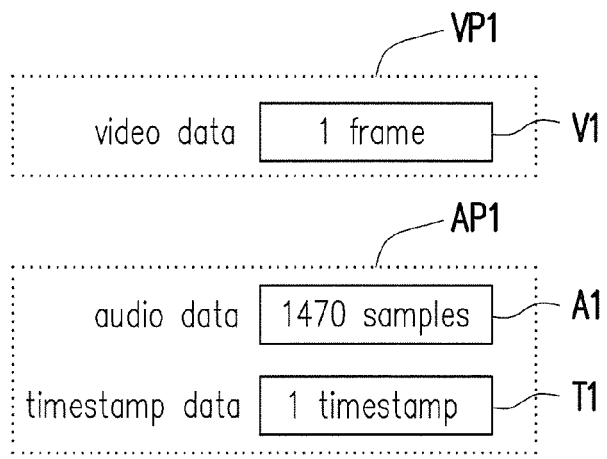
FIG. 3B illustrates a schematic diagram of a video packet and an audio packet according to an embodiment of the invention.

Referring now to FIG. 3B, in the present embodiment, the processor 117 of the electronic device 100 would generate a video packet VP1 by using the video data V1, generate an audio packet AP1 by using the video data A1 and the timestamp data T1, and set the video packet VP1 and the audio packet AP1 as the transmission data. In the present embodiment, the reason to group the timestamp data T1 and the audio data A1 into a same packet is that the human is more sensitive to sound, and thus it is preferred to ensure that the audio data A1 would be received and played in order.

Figure 4:
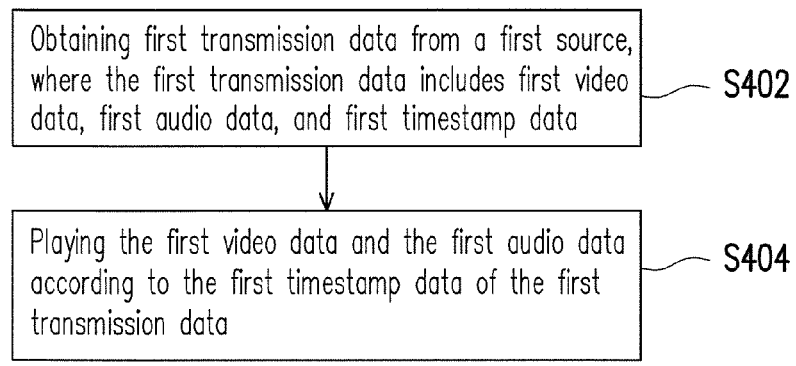
FIG. 4 illustrates a flowchart of a timestamp-based audio and video processing method according to an embodiment of the invention.

After the electronic device 100 generates the transmission data, it could directly play the transmission data by itself or transmit the transmission data to other electronic devices. To be specific, FIG. 4 illustrates a flowchart of a timestamp-based audio and video processing method according to an embodiment of the invention. The method in the present embodiment is adapted to the electronic device 100 of FIG. 1 or other similar electronic devices.

Referring to FIG. 4, the processor 117 of the electronic device 100 would obtain first transmission data from a first source, where the first transmission data includes first video data, first audio data, and first timestamp data (Step S402). The current step is continued after Step S206, and the first transmission data from the first source could be the transmission data generated by the electronic device 100 or obtained from other electronic devices via the communication circuit 112. The first transmission data could include the two aforementioned data formats. The two data formats both include the first video data having a single video frame with a variable file size, the first audio data having multiple audio files with a fixed file size, and the first timestamp recording time intervals and packet sequence number data.

Next, the processor 117 of the electronic device 100 would play the first video data and the first audio data according to the first timestamp data of the first transmission data (Step S404). To be specific, the processor 117 of the electronic device 100 would play the first video data and the first audio data corresponding to the time interval and the packet serial number recorded in the corresponding first timestamp so as to ensure that the first transmission data arrives in a timely manner for audio to video synchronization without being affected by collision or routing problems.

Before the electronic device 100 plays the transmission data, it would process the transmission data on the basis of different data formats. Various embodiments would be illustrated hereinafter.

In the first embodiment, the processor 117 of the electronic device 100 would process first transmission data received from a first source, where the data format of the first transmission data is a first audio-video packet including first video data, first audio data, and first timestamp data. Herein, the memory 116 of the electronic device 100 would further include a data buffer (referred to as "a first data buffer" hereinafter) having multiple temporary positions (referred to as "first temporary positions" hereinafter). After the processor 117 of the electronic device 100 receives the first transmission data, it would push the first audio-video packet to the first temporary positions sequentially according to the first timestamp data in the first audio-video packet. When the first audio-video packet is sorted at first among the first temporary positions, the processor 117 of the electronic device 100 would play the first video data and the first audio data of the first audio-video packet respectively by the screen 111 and the audio playing device 114. Since the processor 117 would play the first video data and the first audio data belonging to a same audio-video packet according to the timestamp data, audio to video synchronization could be thereby accomplished.

Figure 5A:
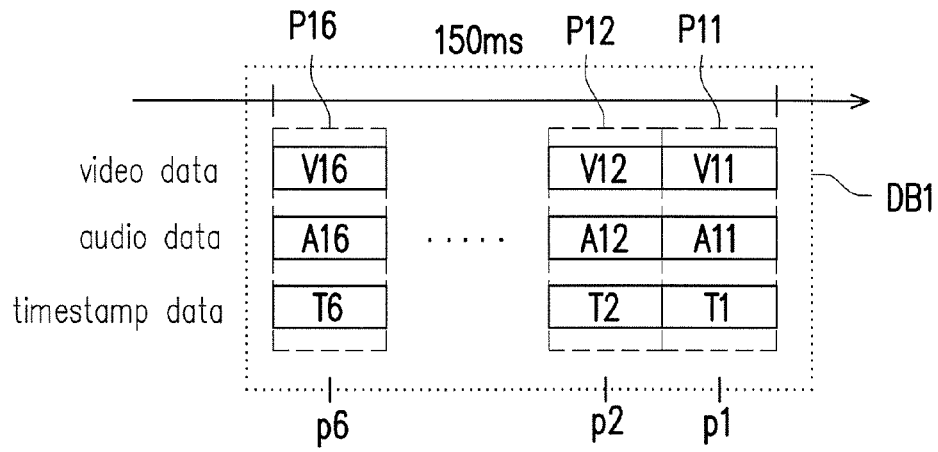
FIGS. 5A-5B illustrate schematic diagrams of an audio and video processing method according to the first embodiment of the invention.
Figure 5B:
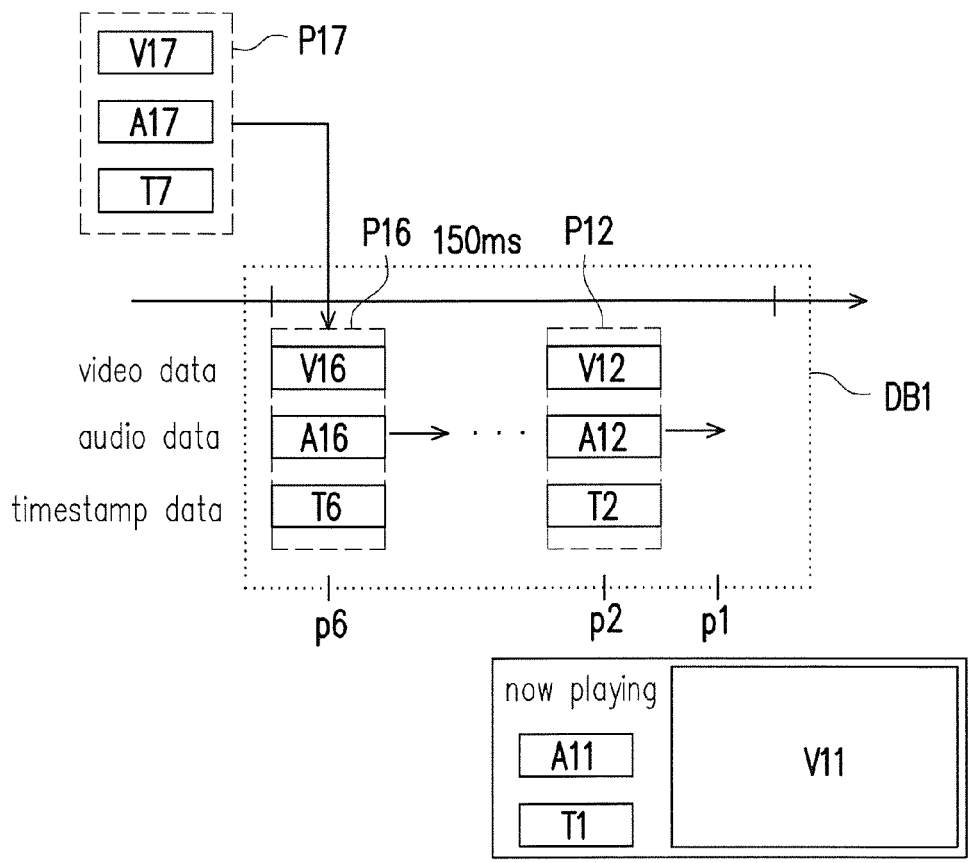

To be specific, FIGS. 5A-5B illustrate schematic diagrams of an audio and video processing method according to the first embodiment of the invention.

Referring to FIG. 5A, at a given time point t, the processor 117 of the electronic device 100 has already received audio-video packets P11-P16, which respectively include video data V11-V16, audio data A11-A16, and timestamp data T1-T6. The processor 117 would sort the audio-video packets P11-P16 at temporary positions p1-p6 of a first data buffer DB1 in a chronological order according to the timestamp data T1-T6.

Referring now to FIG. 5B, the processor 117 of the electronic device 100 would continuously receive and play packets. At a next time point (t+1), the processor 117 would play the video data V11 and the audio data A11 sorted at the temporary position p1 in FIG. 5A respectively on the screen 111 and by the audio playing device 114. Meanwhile, the processor 117 would also push each of the audio-video packets P12-P16 forward to its preceding temporary position, and receive and push an audio-video packet P17 including video data V17, audio data A17, and timestamp data T17 to the temporary position p6. At preceding time points, the processor 117 would also process other audio-video packets in a same fashion until all the transmission data is transmitted.

In another embodiment, the processor 116 of the electronic device 100 would not only process the first transmission data from the first source, but would also concurrently process transmission data obtained from other sources.

In detail, in the second embodiment, the processor 117 of the electronic device 100 would concurrently process first transmission data obtained from a first source and second transmission data obtained from a second source. The data format of the first transmission data is a first audio-video packet including the first video data, the first audio data, and the first timestamp data. The data format of the second transmission data is a second audio-video packet including second video data, second audio data, and second timestamp data. Herein, the memory 116 of the electronic device 100 would further include another data buffer (referred to as "a second data buffer" hereinafter) having multiple temporary positions (referred to as "second temporary positions"). Moreover, the first source could be the electronic device 100 itself, and the second source could be another electronic device. Alternatively, the two sources could be other two electronic devices. The invention is not limited in this regard.

Similarly, after the processor 117 of the electronic device 100 receives the first transmission data, it would push the first audio-video packet to the first temporary positions of the first data buffer sequentially according to the first timestamp data in the first audio-video packet. Moreover, after the processor 117 of the electronic device 100 receives the second transmission data, it would push the second audio-video packet to the second temporary positions of the second buffer sequentially according to the second timestamp data in the second audio-video packet.

It should be noted that, in the present embodiment, when the first audio-video packet is sorted at first among the first temporary positions and when the second audio-video packet is sorted at first among the second temporary positions, the processor 117 of the processor 100 would concurrently playing the first video data in the first audio-video packet and the second video data in the second audio-video packet by a multi-window or a pop-up play by using the screen 111, and it would also play audio data integrated from the first audio data in the first audio-video packet and the second audio data in the second audio-video packet through, for example, audio mixing technique by using the audio playing device 114.

Figure 6A:
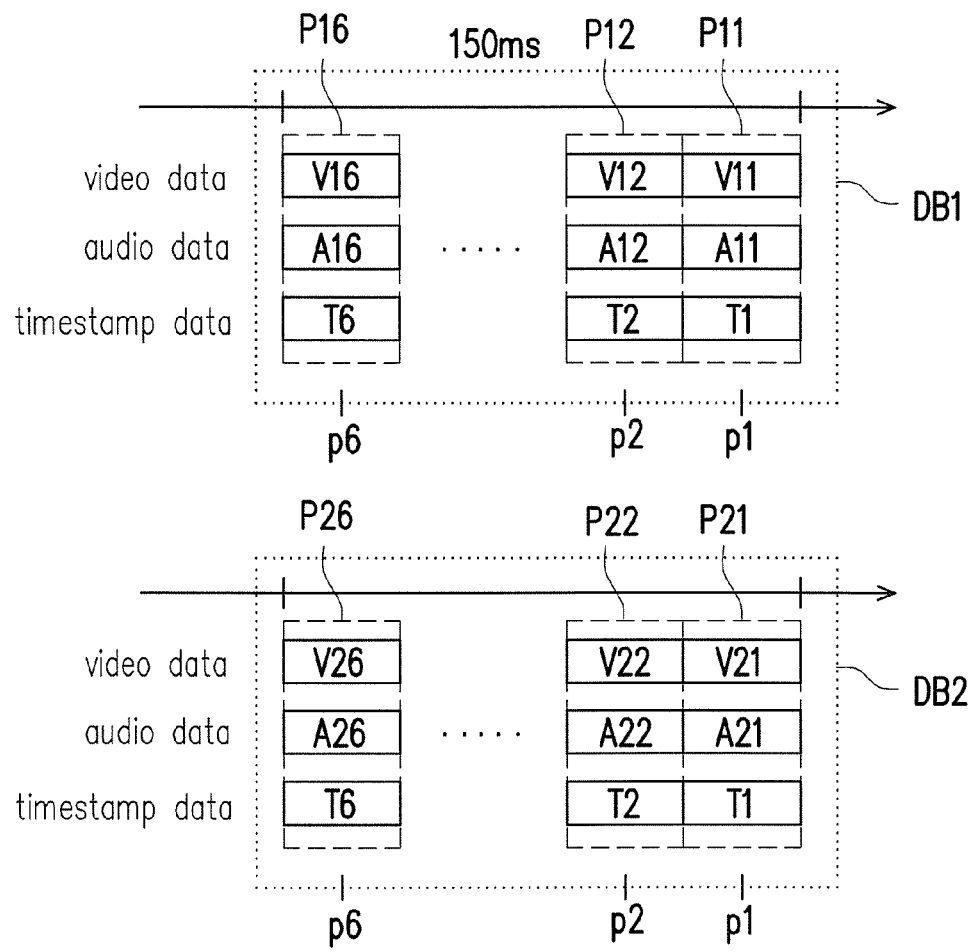
FIGS. 6A-6B illustrate schematic diagrams of an audio and video processing method according to the second embodiment of the invention.
Figure 6B:
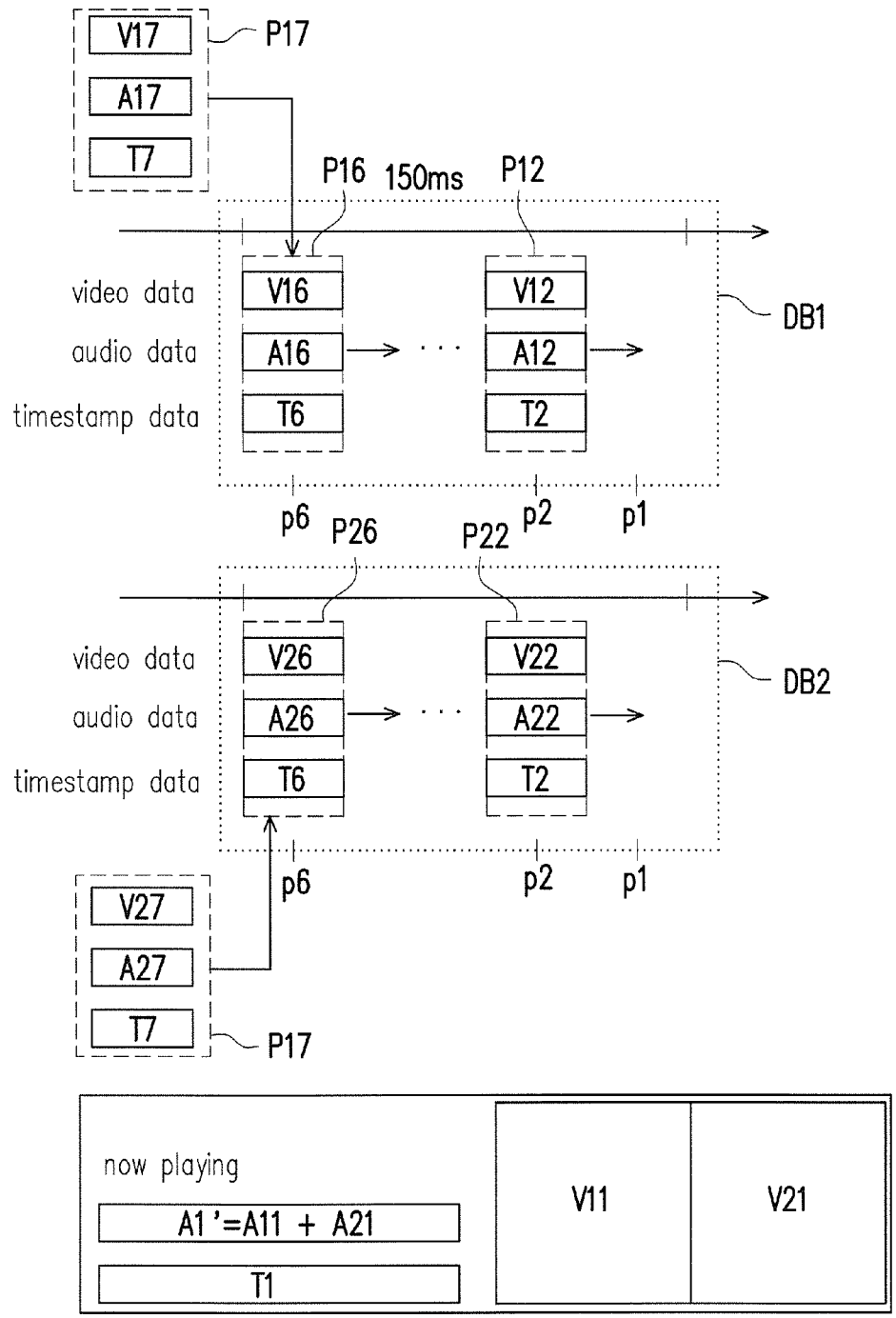

To be specific, FIGS. 6A-6B illustrate schematic diagrams of an audio and video processing method according to the second embodiment of the invention.

Referring to FIG. 6A, at a given time point t, the processor 117 of the electronic device 100 has already received audio-video packets P11-P16, which respectively include video data V11-V16, audio data A11-A16, and timestamp data T1-T6. The processor 117 would sort the audio-video packets P11-P16 at temporary positions p1-p6 of a first data buffer DB1 in a chronological order according to the timestamp data T1-T6. Moreover, the processor 117 of the electronic device 100 has also received audio-video packets P21-P26, which respectively include video data V21-V26, audio data A21-A26, and timestamp data T1-T6. The processor would sort the audio-video packets P21-P26 at temporary positions p1-p6 of a second data buffer DB2 in a chronological order according to the timestamp data T1-T6.

Referring now to FIG. 6B, the processor 117 of the electronic device 100 would continuously receive and play packets. At a next time point (t+1), the processor 117 would concurrently play the video data V11 and the video data V21 respectively sorted at the temporary positions p1 in the first data buffer DB1 and the second data buffer DB2 as illustrated in FIG. 6 by, for example, a multi-window by using the screen 111, and it would also integrate the first audio data A11 and the second audio data A12 through, for example, audio mixing technique, and play integrated audio data A1' by using the audio playing device 114. Meanwhile, the processor 117 would also push each of the audio-video packets P12-P16 and P22-P26 respectively to its preceding temporary position, and would receive and push an audio-video packet P17 including video data V17, audio data A17, and timestamp data T17 as well as an audio-video packet P27 including video data V27, audio data A27, and timestamp data T27 to the temporary positions p6 in both the first data buffer DB1 and the second data buffer DB2. At preceding time points, the processor 117 would also process other audio-video packets in a same fashion until all the transmission data is transmitted.

In the third embodiment, the processor 117 of the electronic device 100 would process first transmission data obtained from a first source, where the data format of the first transmission data is a first video packet including first video data and first audio packet including the audio data and first timestamp data. Herein, the memory 116 of the electronic device 100 further includes a video buffer (referred to as "a first video buffer") having a single temporary position (referred to as "a first video temporary position") and an audio buffer (referred to as "a first audio buffer") having multiple audio temporary positions (referred to as "first audio temporary positions").

When the processor 117 of the electronic device 100 receives the first video packet, it would directly push the first video packet to the first video temporary position in the first video buffer. The processor 117 would immediately play the first video data in the first video packet at the first video temporary position by using the screen 111. Since the first video temporary position is the only temporary position in the first video buffer, whenever the processor 117 receives and pushes the first video packet to the first video buffer, the first video packet would overwrite a packet which is originally at the first video temporary position.

On the other hand, when the processor 117 of the electronic device 100 receives the first audio packet, it would push the first audio packet to the first audio temporary positions in the first audio buffer sequentially. When the first audio packet is sorted at first among the first audio temporary positions, the processor 117 of the electronic device 100 would play the first audio data in the first audio packet using by the audio playing device 117.

It should be noted that, given that the processor 117 would directly push the first video packet to the first video buffer and immediately play the first video packet thereafter, since the first video data could be compressed to different file sizes according to different network transmission bandwidths, the first video data would be able to be played smoothly and continuously. Moreover, in the present embodiment, since the first timestamp data and the first audio data are grouped into a same packet and sorted in the first audio buffer sequentially, the first audio data is ensured to be played in sequence. Accordingly, the processor 117 of the electronic device 100 could guarantee audio to video synchronization by using the screen 111 and the audio playing device 114.

Figure 7A:
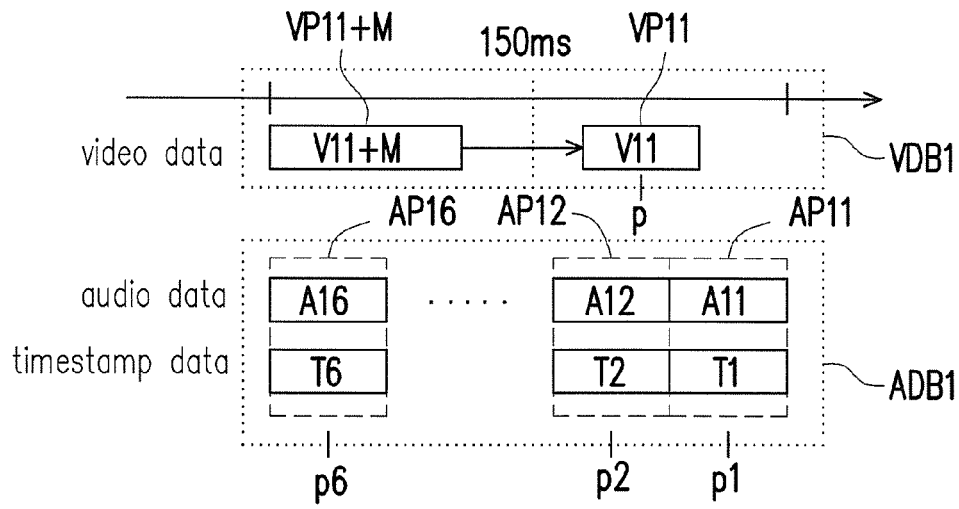
FIGS. 7A-7B illustrate schematic diagrams of an audio and video processing method according to the third embodiment of the invention.
Figure 7B:
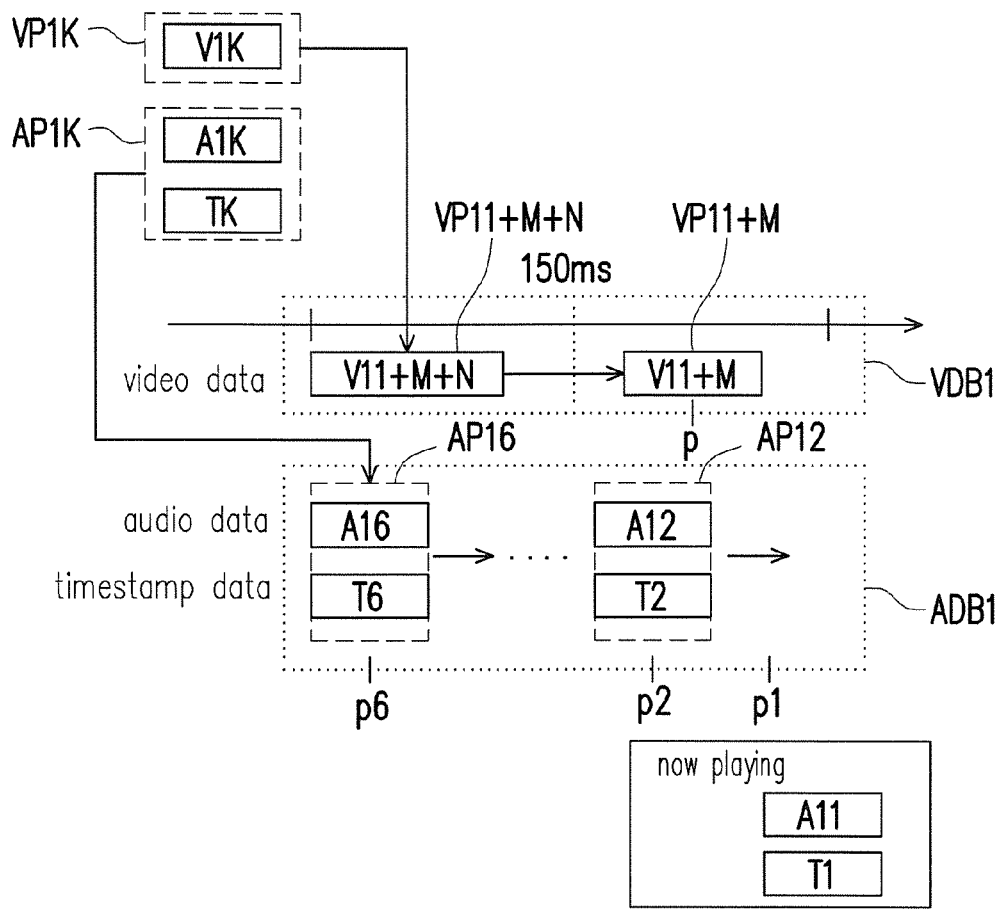

To be specific, FIGS. 7A-7B illustrate schematic diagrams of an audio and video processing method according to the third embodiment of the invention.

Referring to FIG. 7A, at a given time point t, the processor 117 of the electronic device 100 has already received audio packets AP11-AP16 respectively include audio data A11-A16 and timestamp data T1-T6, and the processor 117 would sort the audio packets AP11-AP16 at temporary positions p1-p6 in a first audio buffer ADB1 sequentially according to the timestamp data T1-T6. Moreover, the processor 117 of the electronic device 100 has already received and pushed a video packet VP11 to a temporary position p in a first video buffer VDB1. The video buffer VDB1 would also prepare to receive a video packet VP11+M including video data V11+M, where M>0.

Referring now to FIG. 7B, the processor 117 of the electronic device 100 would continuously receive and play packets. At a next time point (t+1), the processor 117 would play the video data V11 at the temporary position p in the first video buffer VDB1 as well as audio data A11 at a temporary position p1 in a first audio buffer ADB1 as illustrated in FIG. 7A by respectively using the screen 111 and the audio playing device 114. The processor 117 would first overwrite the video packet VP11 originally at the temporary position p by the video packet V11+M. Meanwhile, the first video buffer VDB1 would prepare to receive a video packet VP11+M+N including video data V11+M+N, where N>0. The processor 117 would also push each of the audio packets AP12-AP16 to its preceding temporary position. Next, the processor 117 would receive a video packet VP1K including video data V1K and an audio packet AP1K including audio data A1K and timestamp data TK, where M+N<K. At preceding time points, the processor 117 would also process other video packets and audio packets in a same fashion until all the transmission data is transmitted.

Similarly, in another embodiment, the processor 117 of the electronic device 100 would not only process the first transmission data from the first source, but would also concurrently process transmission data obtained from other sources.

In detail, in the fourth embodiment, the processor 117 of the electronic device 100 could concurrently process first transmission data from a first source and second transmission data from a second source. The data format of the first transmission data is a first video packet including first video data and a first audio packet including first audio data and first timestamp data, and the data format of the second transmission data is a second video packet including second video data and a second audio packet including second audio data and second timestamp data. Herein, the memory 117 of the electronic device 100 further includes a video buffer (refereed to as "a second video buffer" hereinafter) having a single temporary position (referred to as "a second video temporary position" hereinafter) and an audio buffer (referred to as "a second audio buffer" hereinafter) having multiple audio temporary positions (referred to as "second audio temporary positions"). The first source could be the electronic device 100 itself, and the second source could be another electronic device. Alternatively, the two sources could be two other electronic devices. The invention is not limited in this regard.

Similar to the third embodiment, after the processor 117 receives the first video packet, it would directly push the first video packet to the first video temporary position in the first video buffer. Also, after the processor 117 receives the second video packet, it would directly push the second video packet to the second video temporary position in the second video buffer. On the other hand, after the processor 117 receives the first audio packet, it would push the first audio packet to the first audio temporary positions in the first audio buffer sequentially according to the first timestamp data in the first audio packet. Also, after the processor 117 receives the second audio packet, it would push the second audio packet to the second audio temporary positions in the second audio buffer sequentially according to the second timestamp data in the second audio packet.

When the first video packet and the second video packet are concurrently at the first video temporary position in the first video buffer and the second video temporary position in the second video buffer respectively, the processor 117 would select and play one of the pieces. The selection mechanism would be described later on. Meanwhile, when the first audio packet and the second audio packet are respectively sorted at the first temporary positions in the first audio buffer and the second audio buffer, the processor 117 would integrate the first audio data in the first audio packet and the second audio data in the second audio packet into integrated audio data. Similar to the third embodiment, the processor 117 of the electronic device 100 would concurrently play the selected video data and the integrated audio data respectively by using the screen 111 and the playing device 114.

In the present embodiment, the processor 117 could select the video data according to volumes of the audio data. For example, the processor 117 would calculate an average volume of audio samples of the first audio data and an average volume of audio samples of the second audio data to respectively obtain a first average volume and a second average volume. When the first average volume is greater than the second average volume, the processor 117 would select the first video data as the selected video data. When the second average volume is greater than the first average volume, the processor 117 would select the second video data as the selected video data. In another embodiment, the processor 117 could also calculate average volumes of all audio data respectively in the first audio buffer and the second audio buffer as the first average volume and the second average volume, and could select the video data corresponding to the one with a maximal average volume as the selected video data.

Figure 8A:
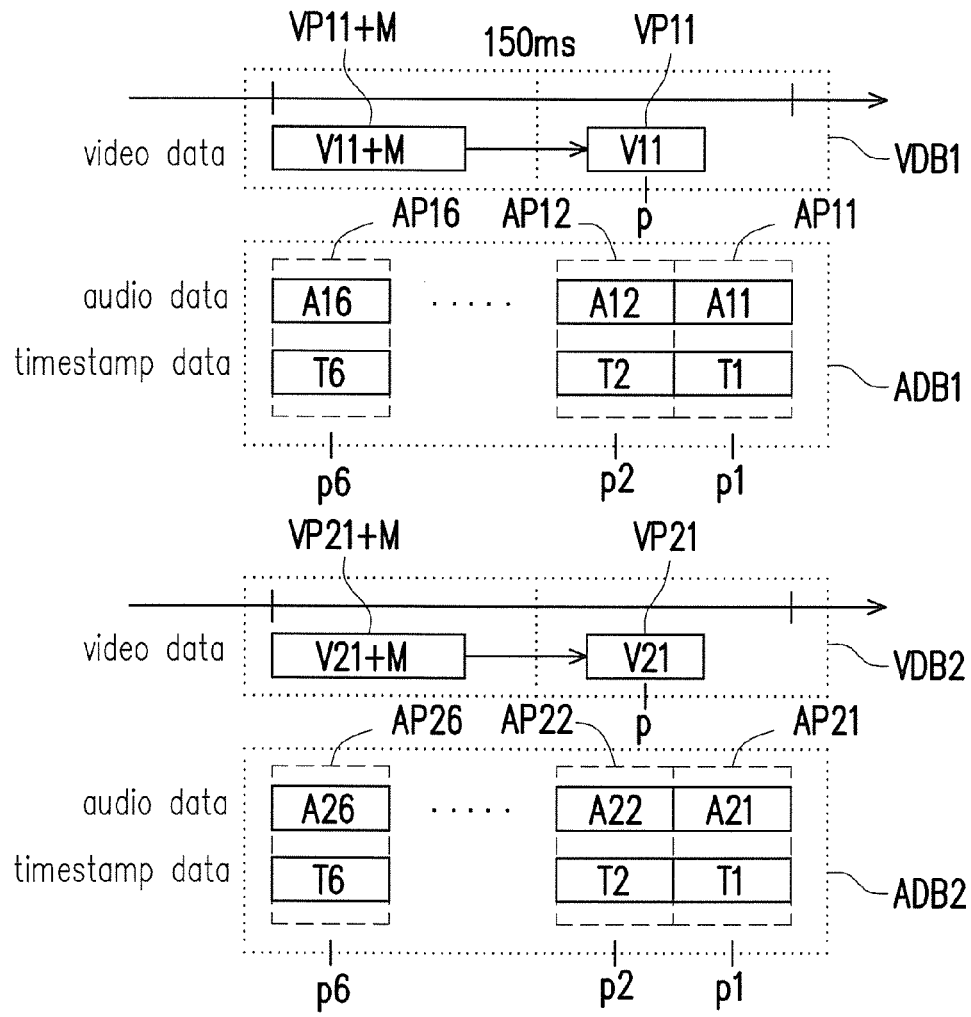
FIGS. 8A-8B illustrate schematic diagrams of an audio and video processing method according to the fourth embodiment of the invention.
Figure 8B:
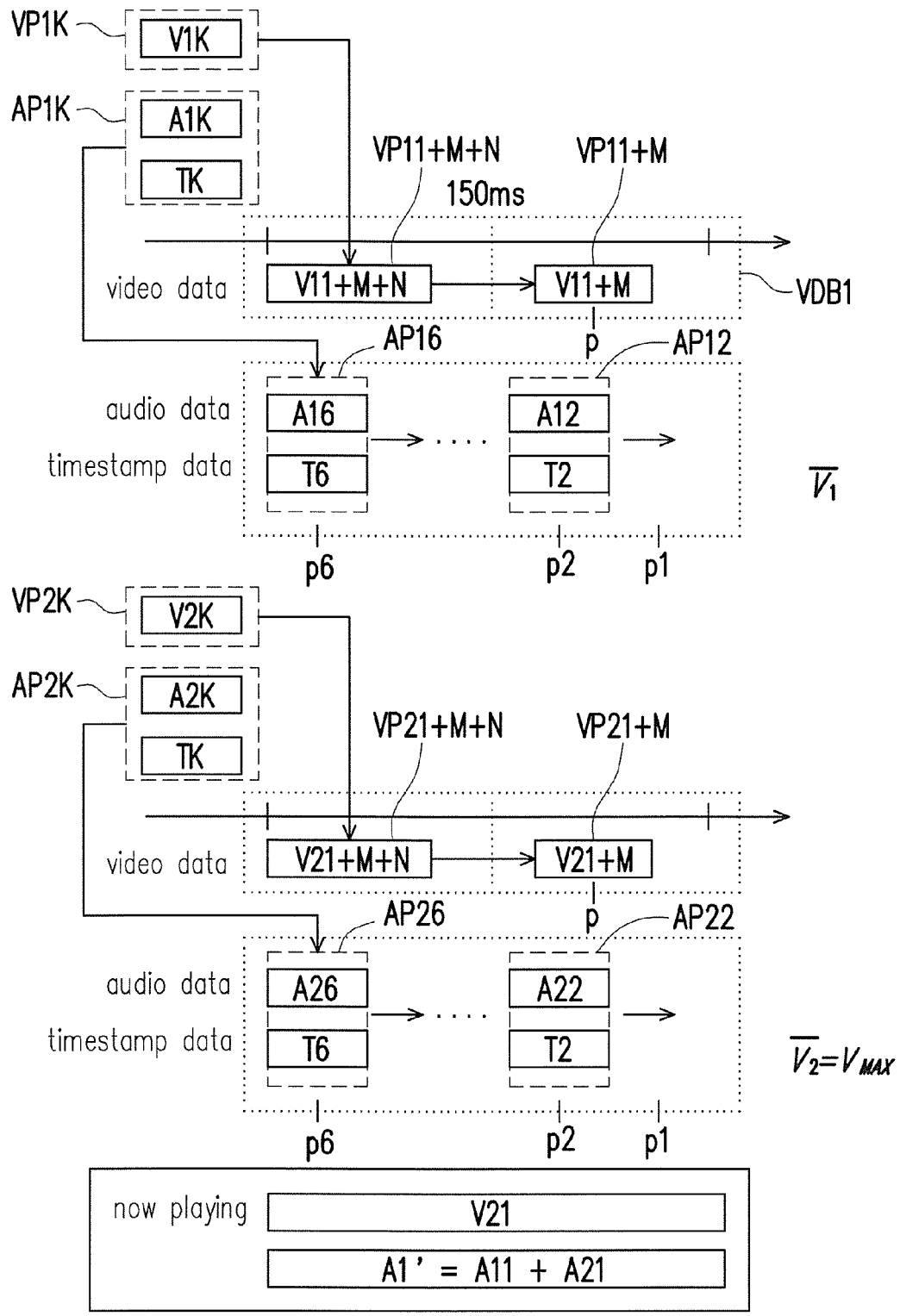

To be specific, FIGS. 8A-8B illustrate schematic diagrams of an audio and video processing method according to the fourth embodiment of the invention.

Referring to FIG. 8A, at a given time point t, the processor 117 of the electronic device 100 has already received audio packet AP11-AP16 respectively including audio data A11-A16 and timestamp data T1-T6, and the processor 117 would sort the audio packet PA11-PA16 at temporary positions p1-p6 in the first audio buffer ADB1 sequentially. In particular, the processor 117 would calculate an average volume $\overline{V_1}$ of all audio samples of the audio data A11-A16. Moreover, the processor 117 of the electronic device 100 has already received and pushed a video packet VP11 to a temporary position p in the first video buffer VDB1. The first video buffer VBD1 would also immediately receive a video packet VP11+M including video data V11+M thereafter.

On the other hand, the processor 117 of the electronic device 100 has also received audio packets AP21-AP26 respectively including audio data A21-A26 and timestamp data T1-T6. The processor 117 would sort the audio packets AP21-AP26 at temporary positions p1-p6 in the second audio buffer ADB2 in a chronological order according to the timestamp data T1-T6. In particular, the processor 117 would calculate an average volume $\overline{V_2}$ of all audio samples of the audio data A21-A26, where $\overline{V_2} > \overline{V_1}$. That is, $\overline{V_2}$ is the maximum among all of the average volumes $V_{MAX}$. Moreover, the processor 117 of the electronic device 100 has already received and pushed a video packet VP21 to a temporary position p in the first video buffer VDB1. The second video buffer VBD2 would also immediately receive a video packet VP21+M including video data V21+M thereafter.

Referring now to FIG. 8B, the processor 117 of the electronic device 100 would continuously receive and play packets. Since $\overline{V_2} > \overline{V_1}$, at the next time point (t+1), the processor 117 would play the video data V11 at the temporary position p in the first video buffer VDB1 as illustrated in FIG. 7A by using the screen 111. The processor 117 would also integrate the first audio data A11 and the second audio data A12 through, for example, audio mixing technique, and play integrated audio data A1' by using the audio playing device 114. The processor 117 would first overwrite the video packet VP11 and the video packet VP21 respectively originally at the temporary positions p in the first audio buffer ADB1 and the second audio buffer ADB2 by the video packet VP11+M and the video packet VP21+M. The first video buffer VDB1 and the second video buffer VDB2 would also prepare to receive the video packet VP11+M+N including the video data V11+M+N and the video packet VP21+M+N including video data V11+M+N. Meanwhile, the processor 117 would also push each of the audio-video packets P12-P16 and the P22-P26 respectively to its preceding temporary positions and receive a video packet VP1K including video data V1K, a audio packet P1K including audio data A1K and timestamp data TK, a video packet VP2K including video data V2K, and an audio packet P2$k$ including audio data A2K and timestamp data TK. At preceding time points, the processor 117 would also process video packets and audio packets in a same fashion until all the transmission data is transmitted.

Figure 9:
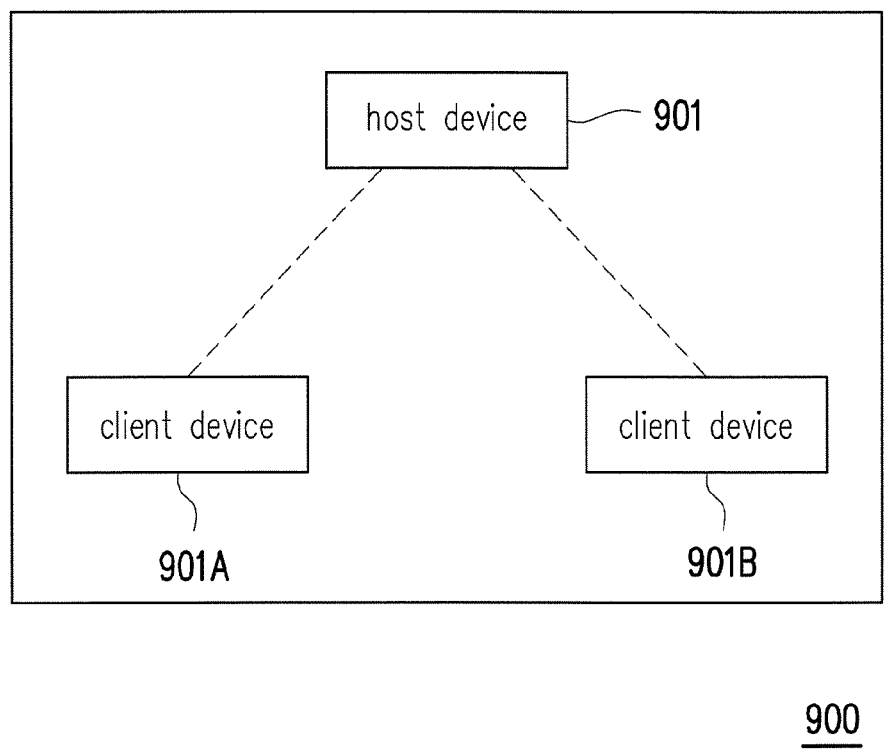
FIG. 9 illustrates a schematic diagram of an audio and video processing system according to an embodiment of the invention.

The aforeillustrated embodiments could be summarized as stand-alone playing, one-to-one transmission and playing, and multiple-to-one transmission and playing, where the data format of a single audio-video packet or the data format of a separated video packet and a separated audio packet could both be used in each of the approaches. The embodiments would be applicable to an audio and video processing system as illustrated in FIG. 9. A video conference system would be illustrated as an implementation in the present embodiment. However, the invention is not limited in this regard.

Referring to FIG. 9, in the present embodiment, a system 900 is video conference system composed by multiple devices similar to the electronic device 100. One of the devices could be selected as a host device 910, and the rest of the devices could be set as client devices 910A-910B, where the client devices 910A-910B could be connected to the host device 910 through a communication network. It should be noted that, the client devices 910A-910B in the system 900 are only illustrated for simplicity purposes. In other embodiments, the system 900 could provide more than two client devices to be connected to the host device 910 to perform the follow-up steps. The invention is not limited in this regard.

As an example of stand-alone playing, the host device 910 would extract an audio signal and an image signal itself to generate host transmission data including host audio data, host video data, and host timestamp data, where the host video data includes a single video frame with a variable file size, and the host audio data includes multiple audio files with a fixed file size. The host transmission data in this case could include two data formats. One could be an audio-video packet generated from the host video data, the host audio data, and host timestamp data, and the other one could be a video packet generated from the host video data and an audio packet generated form the host audio data and the host timestamp data. Next, the host device 910 would play the host video data and the host audio data according to the host timestamp data in the host transmission data.

As an example of one-to-one transmission and playing, after the client device 910A extracts an audio signal and an image signal itself, it would generate client transmission data including client audio data, client video data, and client timestamp data, where the client video data includes a single video frame with a variable file size, and the client audio data includes multiple audio files with a fixed file size. The client transmission data in this case could include two data formats. One could be an audio-video packet generated from the client video data, the client audio data, and client timestamp data, and the other one could be a video packet generated from the client video data and an audio packet generated form the client audio data and the client timestamp data. Next, the client device 910A would transmit the client transmission data to the host device 910, and the host device 910 would play the client video data and the client audio data of the client device 910A according to the client timestamp data.

As an example of multiple-to-one transmission and playing in which the data format is a single audio-video packet, after the host device 910 obtains the host transmission data of itself and the client transmission data of the client device 910A, it would integrate and play the host audio data and the client audio data as well as play the host video data and client video data by a multi-window or a pop-up play. In another example, the host device could also obtain the client transmission data from the client device 910A and the client device 910B, integrate and play the client audio data of the two devices as well as play the client video data of the two devices by a multi-window or a pop-up play.

As an example of multiple-to-one transmission and playing in which the data format is a separated video packet and a separated audio packet, after the host device 910 obtains the host transmission data itself and the client transmission data from the client devices 910A-910B, it would determine and play the video data with a maximum average volume among the host audio data and the client audio data of the client devices 910A-910B, and play the audio data integrated from the host audio data and the client audio data of the client devices 910A-910B.

It should be noted that, the details of processing and playing the audio and video data illustrated in FIG. 9 could refer to the related descriptions of FIG. 2-FIG. 8 and would not be repeated hereinafter.

In summary, in the timestamp-based audio and video processing method and the system thereof, an audio signal and an image signal would be extracted and converted to transmission data with particular data formats of audio data, video data, and timestamp data so that a data receiving device is allowed to accomplish audio-to-video synchronization.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A timestamp-based audio and video processing method, adapted to an image capturing device and an audio receiving device, comprising:

obtaining first transmission data from a first source and obtaining second transmission data from a second source, wherein the first transmission data is an audio-video packet comprising first video data, first audio data, and first timestamp data, wherein the first video data comprises a single video frame with a variable file size, wherein the first audio data comprises a plurality of audio files with a fixed file size, wherein the second transmission data is a second audio-video packet comprising second video data, second audio data, and second timestamp data, wherein the second video data comprises a single video frame with a variable file size, wherein the second audio data comprises a plurality of audio files with a fixed file size, and wherein the electronic device comprises a first data buffer having a plurality of first temporary positions and a second data buffer having a plurality of second temporary positions;

pushing the first audio-video packet to the first temporary positions sequentially according to the first timestamp data in the first audio-video packet and pushing the second audio-video packet to the second temporary positions sequentially according to the second timestamp data in the second audio-video packet; and when the first audio-video packet is sorted at first among the first temporary positions and when the second audio-video packet is sorted at first among the second temporary positions, concurrently playing the first video data and the first audio data in the first audio-video packet as well as the second video data and the second audio data in the second audio-video packet respectively by using the screen and the audio playing device according to the first timestamp data of the first transmission data and the second timestamp data of the second transmission data.

2. The method according to claim 1, wherein the electronic device concurrently plays the first video data and the second video data by a multi-window or a pop-up play on the screen.

3. A timestamp-based audio and video processing method, adapted to an image capturing device and an audio receiving device, comprising:

obtaining first transmission data from a first source, wherein the first transmission data is a first video packet comprising first video data comprising first video data and a first audio packet comprising first audio data and first timestamp data, wherein the first video data comprises a single video frame with a variable file size, wherein the first audio data comprises a plurality of audio files with a fixed file size, and wherein the electronic device comprises a first video buffer having a single first video temporary position and a first audio buffer having a plurality of first audio temporary positions;

pushing the first video packet to the first video temporary position;

pushing the first audio packet to the first audio temporary positions sequentially according to the first timestamp data in the first audio packet; and playing the first video data and the first audio data respectively by using the screen and the audio playing device according to the first timestamp data of the first transmission data.

4. The method according to claim 3, wherein the step of pushing the first video packet to the first video temporary position comprises:

when there exists another packet at the first video temporary position, overwriting the another packet by the first video packet.

5. The method according to claim 3, wherein the step of playing the first video data and the first audio data respectively by using the screen and the audio playing device according to the first timestamp data of the first transmission data comprises:

immediately playing the first video data in the first video packet at the first video temporary position by using the screen; and when the first audio packet is sorted first among the first audio temporary positions, playing the first audio data in the first audio packet by using the audio playing device.

6. The method according to claim 3, wherein the electronic device further comprises a second video buffer having a single second video temporary position and a second audio buffer having a plurality of second audio temporary positions, and wherein the method further comprises:

obtaining second transmission data from a second source, wherein the second transmission data is a second video packet comprising second video data and a second audio packet comprising second audio data and second timestamp data, wherein the second video data comprises a single video frame with a variable file size, and wherein the second audio data comprises a plurality of audio files with a fixed file size;

pushing the second video packet to the second video temporary position;

pushing the second audio packet to the second audio temporary positions sequentially according to the second timestamp data in the second audio packet;

selecting one of the first video data in the first video packet and the second video data in the second video packet to be selected video data;

when the first audio packet and the second audio packet are respectively sorted at first among the first audio temporary positions and the second audio temporary positions, integrating the first audio data in the first audio packet and the second audio data in the second audio packet into integrated audio data; and playing the selected video data and the integrated audio data by respectively using the screen and the audio playing device.

7. The method according to claim 6, wherein the step of selecting one of the first video data in the first video packet and the second video data in the second video packet to be the selected video data comprises:

calculating an average volume of the first audio data and an average volume of the second audio data respectively to obtain a first average volume and a second average volume;

when the first average volume is greater than the second average volume, selecting the first video data to be the selected video data; and when the second average volume is greater than the first average volume, selecting the second video data to be the selected video data.

8. A timestamp-based audio and video processing system comprising:

at least one client device, wherein a first client device and a second client device of the at least one client device are configured to respectively generate first client transmission data and second client transmission data, wherein the first client transmission data is a first audio-video packet comprising first client video data, first client audio data, and first client timestamp data, wherein the second client transmission data is a second audio-video packet comprising second client video data, second client audio data, and second client timestamp data, wherein the first client video data comprises a single video frame with a variable file size, wherein the first client audio data comprises a plurality of audio files with a fixed file size, wherein the second client video data comprises a single video frame with a variable file size, and wherein the second client audio data comprises a plurality of audio files with a fixed file size; and a host device, connected to each of the at least one client device and comprising a first data buffer having a plurality of first temporary positions and a second data buffer having a plurality of second temporary positions, wherein the host device receives the first client transmission data and the second client transmission data, pushes the first audio-video packet to the first temporary positions sequentially according to the first client timestamp data in the first audio-video packet and pushes the second audio-video packet to the second temporary positions sequentially according to the second client timestamp data in the second audio-video packet, wherein when the first audio-video packet is sorted at first among the first temporary positions and when the second audio-video packet is sorted at first among the second temporary positions, the host device plays the first client video data and the first client audio data in the first audio-video packet as well as the second client video data and the second client audio data in the second audio-video packet respectively according to the first client timestamp data of the first transmission data and the second client timestamp data of the second transmission data.

9. The system according to claim 8, wherein the host device further generates host transmission data having host audio data, host video data, and host timestamp data, wherein the host video data comprises a single video frame with a variable file size, wherein the host audio data comprises a plurality of audio files with a fixed file size, and wherein the host device further plays the host video data and the host audio data according to the host timestamp data in the host transmission data.

10. The system according to claim 8, wherein the host transmission data is an audio-video packet generated from the host video data, the host audio data, and the host timestamp data.

11. A timestamp-based audio and video processing system comprising:

at least one client device, wherein a first client device and a second client device of the at least one client device are configured to respectively generate first client transmission data and second client transmission data, wherein the first client transmission data is a first video packet comprising first client video data and a first audio packet comprising first client audio data and first client timestamp data, wherein the second client transmission data is a second video packet comprising second client video data and a second audio packet comprising second client audio data and second client timestamp data, wherein the first client video data comprises a single video frame with a variable file size, the first client audio data comprises a plurality of audio files with a fixed file size, wherein the second client video data comprises a single video frame with a variable file size, and wherein the second client audio data comprises a plurality of audio files with a fixed file size; and a host device, connected to each of the at least one client device and comprising a first video buffer, a first audio buffer, a second video buffer and a second audio buffer, wherein the first video buffer and the second video buffer comprise a first video temporary position and a second video temporary position respectively, and wherein the first audio buffer and the second audio buffer comprise a plurality of first audio temporary positions and a plurality of second audio temporary positions respectively, wherein the host device receives the first client transmission data and the second client transmission data, respectively pushes the first video packet and the second video packet to the first video temporary position and the second video temporary position, and pushes first audio packet to the first audio temporary positions sequentially according to the first client timestamp data and pushes the second audio packet to the second audio temporary positions sequentially according to the second client timestamp data, wherein when the first video packet and the second video packet are concurrently at the first video temporary position and the second video temporary position respectively, the host device plays one of the first video packet and the second video packet, and wherein when the first audio packet and the second audio packet are respectively sorted at the first audio temporary positions and the second audio temporary positions, the host device integrates the first audio packet and the second audio packet into integrated audio data and concurrently plays the integrated audio data with the one of the first video packet and the second video packet.

12. The system according to claim 11, wherein the host device further generates host transmission data having host audio data, host video data, and host timestamp data, wherein the host video data comprises a single video frame with a variable file size, wherein the host audio data comprises a plurality of audio files with a fixed file size, and wherein the host device further plays the host video data and the host audio data according to the host timestamp data in the host transmission data.

13. The system according to claim 12, wherein the host transmission data is a video packet generated from the host video data and an audio packet generated from the host audio data and the host timestamp data.

* * * * *